United States Patent [19]

May

[11] Patent Number: 5,213,177
[45] Date of Patent: May 25, 1993

[54] TRACTION CONTROL SYSTEM RESPONSIVE TO WHEEL SPEED FLUCTUATIONS

[75] Inventor: Kenneth A. May, Churchville, N.Y.

[73] Assignee: Zexel-Gleason USA, Inc., Rochester, N.Y.

[21] Appl. No.: 810,393

[22] Filed: Dec. 19, 1991

[51] Int. Cl.$^5$ .................. B60K 28/16; B60L 3/10
[52] U.S. Cl. .................. 180/197; 364/426.02; 364/426.03
[58] Field of Search .................. 180/197; 364/426.02, 364/426.03; 123/399, 436

[56] References Cited

U.S. PATENT DOCUMENTS

| | | | |
|---|---|---|---|
| 4,739,856 | 4/1988 | Inagaki et al. | 180/197 |
| 4,762,192 | 8/1988 | Harada et al. | 180/197 |
| 4,790,404 | 12/1988 | Naito | 180/197 |
| 4,873,639 | 10/1989 | Sato et al. | 364/426.02 |
| 4,884,650 | 12/1989 | Fujiki et al. | 180/197 |
| 4,884,651 | 12/1989 | Harada et al. | 180/197 |
| 4,886,140 | 12/1989 | Leiber et al. | 180/197 |
| 4,939,656 | 7/1990 | Hoashi et al. | 180/197 |
| 4,979,931 | 12/1990 | Fleischmann et al. | 475/234 |
| 5,012,417 | 4/1991 | Watanabe et al. | 364/426.02 |

FOREIGN PATENT DOCUMENTS 0252384 4/1990 European Pat. Off. .

*Primary Examiner*—Mitchell J. Hill
*Attorney, Agent, or Firm*—Eugene Stephens & Associates

[57] ABSTRACT

A traction control system includes speed sensors (36, 38) associated with a pair of drive wheels (14, 16) for monitoring a vehicle drive train for a pronounced vibration indicative of wheel slip and other speed sensors (40, 42) associated with a pair of non-driving wheels (18, 20) for monitoring vehicle speed. An electronic control unit (52) compares a magnitude of the vibration to a threshold duration that varies with vehicle speed for detecting wheel slip and outputs two command signals for controlling restriction of a differential (24) and a position of engine throttle (32). Differential restriction is increased as a function of a duration of the vibration and decreased as a function of vehicle speed. Engine output power is decreased as a function of a difference between the duration of the vibration and a threshold duration that decreases with increases in vehicle speed.

35 Claims, 4 Drawing Sheets

TRACTION CONTROL SYSTEM RESPONSIVE TO WHEEL SPEED FLUCTUATIONS

TECHNICAL FIELD

The invention relates to the field of vehicle traction control systems for limiting wheel slip during transmissions of power to drive wheels.

BACKGROUND

Traction control systems include three main components, namely, sensors, controllers, and actuators. The sensors provide the controllers with information about one or more vehicle operating conditions such as: vehicle body speed and acceleration, wheel speeds and accelerations, engine speed and torque, throttle position, and steering wheel angle. The controllers process the sensed information to determine the presence of wheel slip and output a command signal to control the actuators for limiting wheel slip. The actuators include one or more devices for accomplishing such tasks as: braking individual drive wheels, restricting differentiation between the drive wheels, limiting engine output power, and engaging additional drive wheels.

The controllers of most traction control systems include microprocessors that execute programs for evaluating the sensed information by a variety of inferential methods to determine the presence of wheel slip. Some of these systems evaluate a large number of sensed operating conditions to help distinguish wheel slip from other independent operations of the drive wheels. Other of these systems exhibit a wide tolerance for wheel slip to avoid interfering with desirable operations of the drive wheels. The former systems are very costly, and the latter systems are at least partly ineffective for eliminating undesirable wheel slip.

European Patent 252 384 of Audi AG discloses a discovery that occurrences of wheel slip are accompanied by detectable vibrations in vehicle drive trains. The vibrations are within a frequency range between ten to fifteen hertz, and are detectable as both mechanical vibrations in the drive line and rotational speed fluctuations of slipping drive wheels. Although the European patent of Audi AG also contains some general suggestions about incorporating this discovery into traction control systems, these suggestions appear to have been largely overlooked commercially.

For instance, the European patent of Audi AG suggests that in response to the detection of the characteristic vibration of wheel slip, vehicle brakes may be applied, engine power may be reduced, or a combination of these responses may be used to eliminate the wheel slip. In addition, individual drive wheels can be monitored for the characteristic vibrations; and other vehicle operating conditions, such as steering wheel angle, can be sensed to better match the available responses to different vehicle operating conditions.

Although no provisions are made for detecting drive train vibrations as an indication of wheel slip, U.S. Pat. Nos. 4,790,404 of Nissan Motor Company and 4,884,650 of Fuji Jukogyo Kabushiki Kaisha disclose examples of traction control systems that incorporate more than one actuator for limiting wheel slip. In fact, both of these traction control systems incorporate separate actuators for restricting differentiation and reducing engine power. The two systems also distinguish between different vehicle operating conditions for responding to the detection of wheel slip with one or more of the actuators.

The state of the art also includes an example of a traction control system that restricts differentiation as a function of vehicle speed, rather than as a function of an operating condition relating to wheel slip. This is shown in U.S. Pat. No. 4,979,931 of Steyr-Daimler-Puch AG which discloses a differential that is controlled to exhibit a maximum amount of resistance to differentiation when the vehicle is at rest, but the resistance decreases to a minimum amount as the vehicle speed increases from rest to a predetermined speed.

SUMMARY OF THE INVENTION

The invention provides for monitoring vehicle drive lines for a vibration known to accompany wheel slip. Differentiation between drive wheels is restricted as a function of a duration of the vibration, and engine output power is reduced as a function of a difference between the duration of the vibration and a threshold duration.

Although the restriction to differentiation is preferably increased with increasing duration of the vibration, the restriction is also decreased with increases in vehicle speed throughout a range of vehicle speeds. The threshold duration for limiting the reduction in engine output power is similarly decreased with increases in vehicle speed. In fact, the vehicle speed at which differential restriction is limited to a minimum preferably corresponds to the vehicle speed at which the threshold duration is also at a minimum.

Thus, at low vehicle speeds, the initial response to the detection of wheel slip is a restriction to differentiation that increases with increasing duration of the wheel slip. The restriction to differentiation resists wheel slip by directing a larger portion of engine torque to a non-slipping drive wheel. The total torque delivered by the drive wheels is thereby also increased, and this helps to accelerate a vehicle that has become stuck or otherwise limited by available traction to a low vehicle speed. However, if the slipping persists for a duration through which differential restriction has increased to a maximum, engine output power is reduced as a function of the further duration of the wheel slip. In other words, if differential restriction is not effective for stopping wheel slip, then the total torque to the drive wheels is reduced to better match the combined traction of the drive wheels.

At high vehicle speeds, there is little reason to help further accelerate the vehicle over deteriorated traction conditions. In fact, higher speeds over traction surfaces that produce wheel slip are probably unsafe, and restriction to differentiation can produce yaw moments that affect vehicle stability. Accordingly, differential restriction is quickly phased out as a response to wheel slip with increasing vehicle speed. However, wheel slip is undesirable at any speed, and the reduction in engine output power replaces differential restriction as the initial response to wheel slip at the higher speeds.

The drive train is preferably monitored by wheel speed sensors that produce respective signals indicative of rotational speeds of two drive wheels. The respective signals are combined into a signal indicative of the average rotational speed of the drive wheels. A portion of the averaged signal is transmitted as a filtered signal limited to a predetermined frequency range corresponding to drive wheel speed fluctuations that accompany wheel slip. A magnitude of the filtered signal is compared to a threshold magnitude to determine the presence of wheel slip. Vehicle speed is also preferably used to reduce the threshold magnitude with increases in vehicle speed.

DRAWINGS

DETAILED DESCRIPTION

Figure 1:
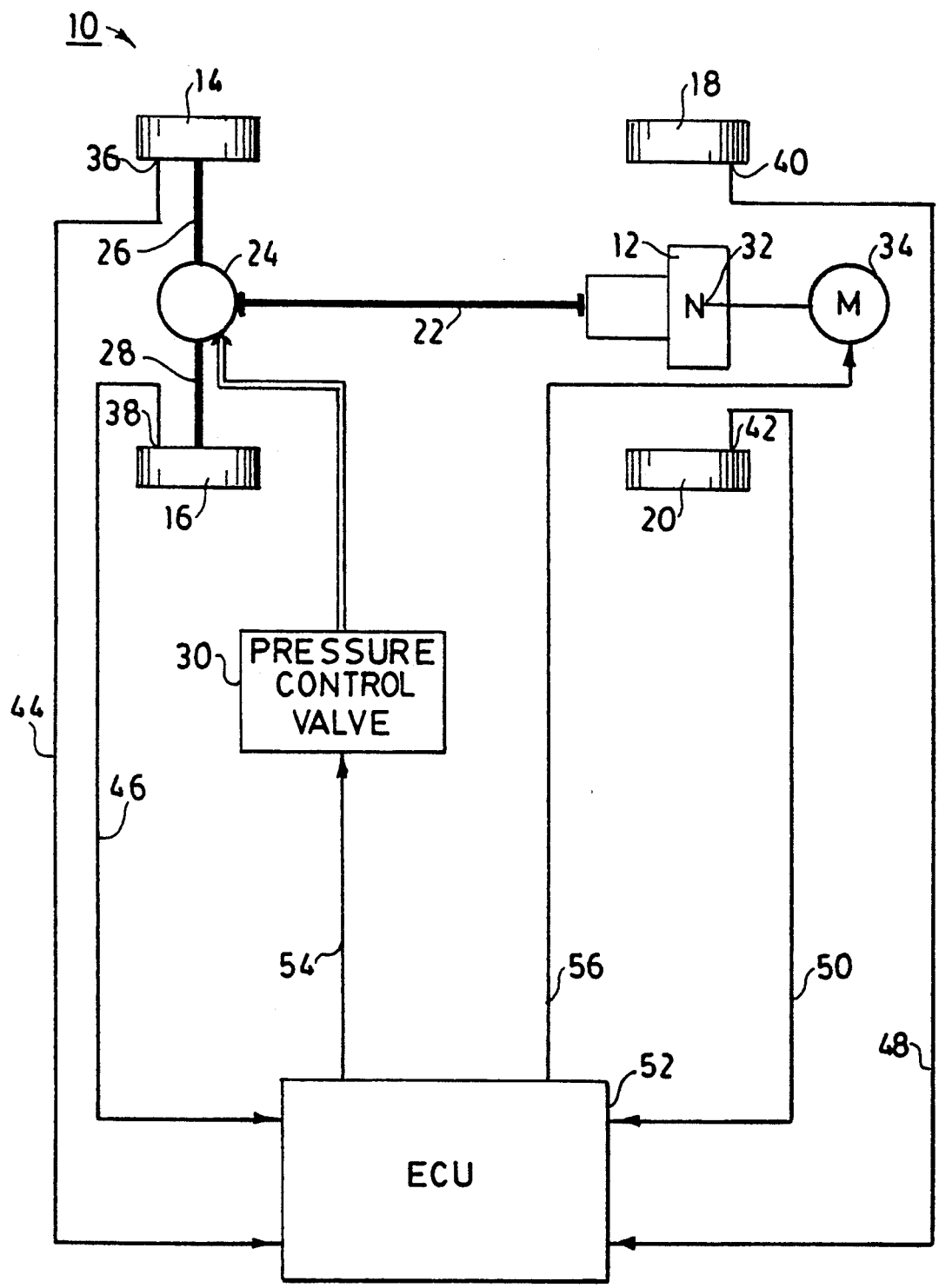
FIG. 1 is a schematic diagram of a traction control system arranged in accordance with the invention.

One embodiment of the invention is illustrated by the six drawing figures. In FIG. 1, a rear wheel drive vehicle 10 is schematically depicted with an engine 12, rear drive wheels 14 and 16, and front wheels 18 and 20. A drive shaft 22 connects the engine 12 to a variable restricting differential 24. Axle halves 26 and 28 interconnect respective rear drive wheels 14 and 16 with the differential 24 in a conventional manner.

Differential restriction is controlled in a known way, e.g., hydraulic braking, by an actuator in the form of a pressure control valve 30. Similarly, engine output power is controlled in a known way by adjusting an engine throttle 32 with an actuator in the form of a motor 34. Variable restricting differentials, engine throttles, and respective actuators appropriate for use in the traction control system of the present invention are now commonplace—such as in the earlier identified U.S. Pat. No. 4,884,650; and this patent is hereby incorporated by reference in support of this disclosure.

Conventional speed sensors, including rear wheel speed sensors 36 and 38 and front wheel speed sensors 40 and 42, produce respective speed signals 44, 46, 48, and 50 indicative of rotational speeds of the wheels 14, 16, 18, and 20. The respective speed signals 44, 46, 48, and 50 are input to an electronic control unit 52 that detects wheel slip and outputs respective command signals 54 and 56 for controlling the pressure control valve 30 and throttle actuating motor 34.

Figure 2:
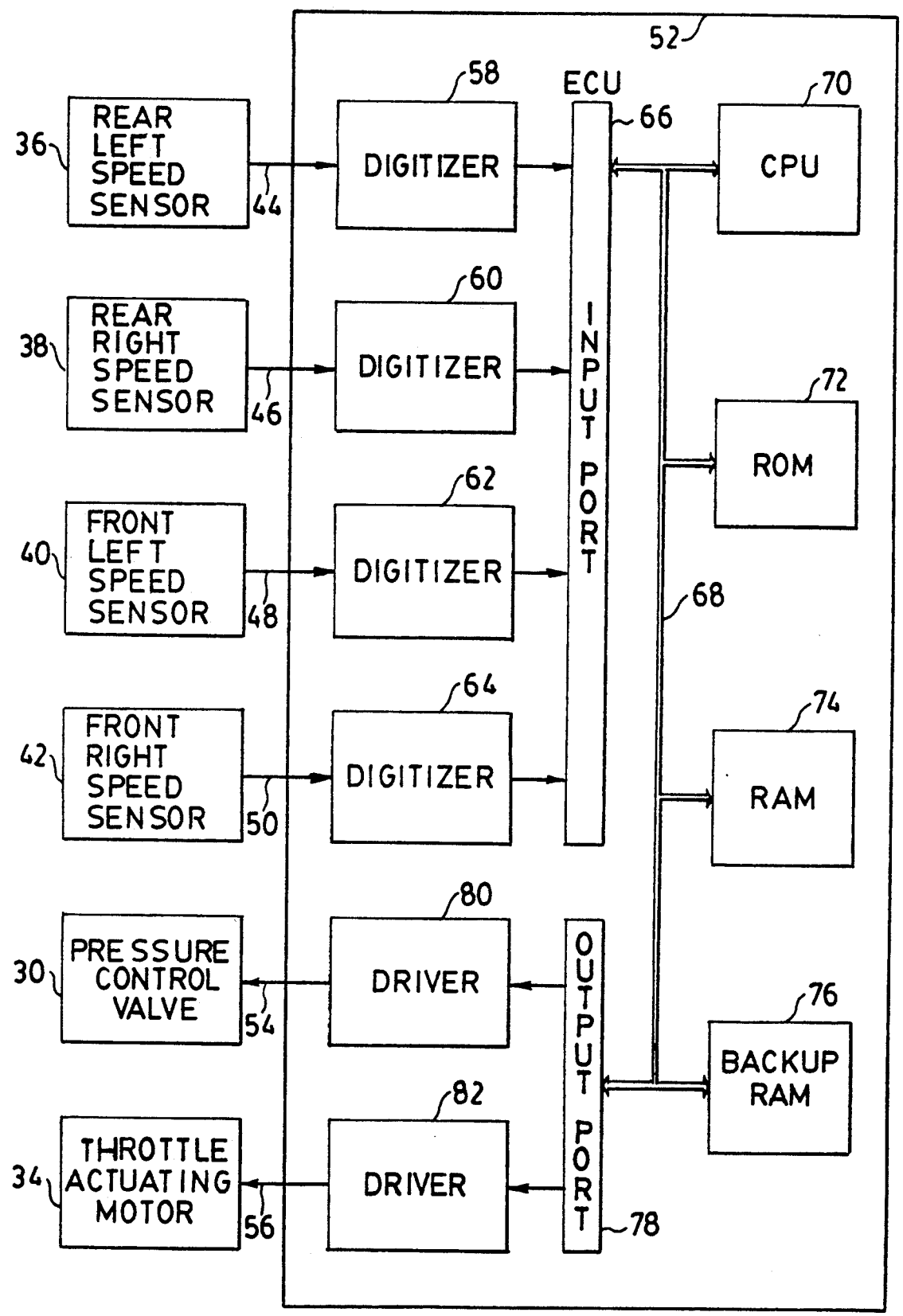
FIG. 2 is block diagram showing structural details of an electronic control unit of the traction control system.

Further details of the structure of the electronic control unit 52 are shown in FIG. 2. Speed signals 44, 46, 48, and 50 from the respective speed sensors 36, 38, 40, and 42 are converted by respective digitizers 58, 60, 62, and 64 from an analog format to a digital format for input into a computer input port 66. A computer bus 68 connects the input port 66 to other conventional computer elements including: a central processing unit (CPU) 70, read-only memory (ROM) 72, random-access memory (RAM) 74, backup random-access memory 76, and an output port 78. Drivers 80 and 82 convert digital signals from the output port 78 into the command signals 54 and 56 that are respectively capable of driving the pressure control valve 30 and throttle actuating motor 34.

Figure 3:
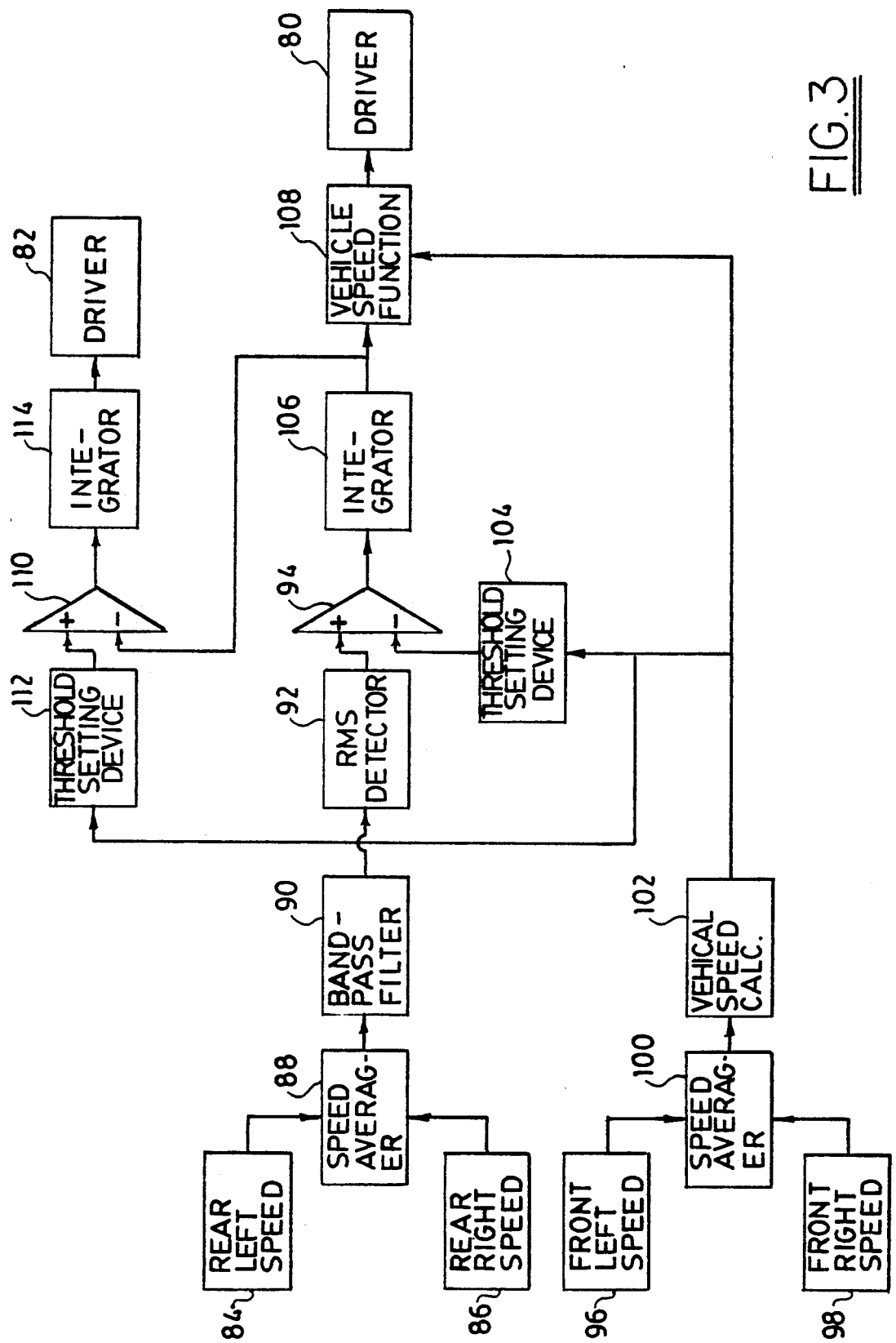
FIG. 3 is a block diagram detailing control logic used by the electronic traction control system.

Control logic for processing the speed signals between the input port 66 and output port 78 of the electronic control unit is shown by a block diagram in FIG. 3. Digitized speed signals 84 and 86 representative of the respective rotational speeds of the rear drive wheels 14 and 16 are combined by a speed averager 88 for producing a signal indicative of the average rotational speeds of the two drive wheels. A bandpass filter 90, constructed according to conventional digital signal processing techniques as a finite impulse response filter, transmits only a portion of the averaged speed signal within a frequency band between ten to fifteen hertz—the known frequency band for wheel speed fluctuations accompanying wheel slip. The transmitted frequency band is received by a level detector in the form of a root mean square (RMS) value detector 92 that outputs a signal proportional to the amplitude of the wheel speed fluctuation frequencies transmitted by the bandpass filter 90. The root mean square signal is one input of a comparator 94 for detecting wheel slip.

Another input of the comparator 94 is derived from information relating to vehicle speed. Similar to the speed signals 84 and 86 from the rear drive wheels, digitized speed signals 96 and 98 are combined by a speed averager 100 for producing a signal indicative of the average rotational speeds of the two front wheels. A vehicle speed calculator 102 converts the averaged speed signal of the front wheels into an estimate of actual vehicle speed for use in performing several functions within the control logic.

Figure 4:
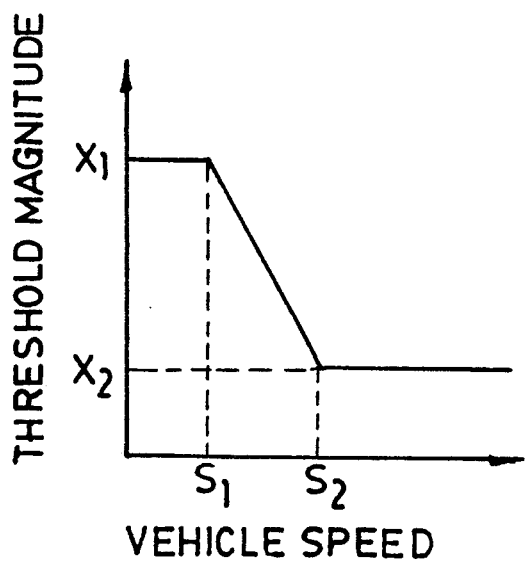
FIG. 4 is a graph showing a relationship between vehicle speed and a threshold magnitude for detecting wheel slip.

For example, the vehicle speed signal is input to a threshold setting device 104 that outputs a threshold signal that varies between two predetermined magnitudes as a function of vehicle speed within a predetermined range of vehicle speeds. FIG. 4 is a graph showing an example of the threshold magnitude output varying between magnitudes of "$X_1$" and "$X_2$" throughout a range of vehicle speeds between "$S_1$" and "$S_2$" (e.g., between 20 kilometers per hour and 60 kilometers per hour). The threshold magnitude signal is the other input of the comparator 94 and reflects a discovery that the root mean square signal of wheel speed fluctuations accompanying wheel slip decreases in magnitude as vehicle speed increases.

The comparator 94 outputs a binary signal having different states that distinguish between magnitudes of the root mean square signal that are above and below the threshold magnitude signal. For example, the comparator 94 produces a positive output when the root mean square signal equals or exceeds the threshold magnitude signal and a zero output when the root mean square signal is less than the threshold magnitude signal. The varying threshold magnitude helps to limit positive output signals from the comparator 94 to actual instances of wheel slip by requiring the root mean square signal to equal or exceed minimum threshold magnitudes that decrease throughout a range of increasing vehicle speeds.

Figure 5:
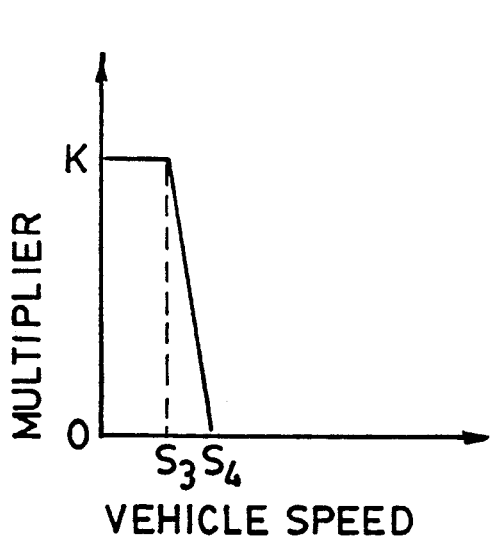
FIG. 5 is a graph showing a relationship between vehicle speed and a multiplier for adjusting the amount of differential restriction with vehicle speed.

The binary output signal from the comparator 94 is received by an integrator 106 that performs an integrating operation for producing a signal indicative of an average duration of the positive output from the comparator over a predetermined interval of time. The integrated signal, which varies in magnitude with the average duration of wheel slip over the predetermined time interval, is transmitted to both a vehicle speed function multiplier 108 and another comparator 110. The vehicle speed function multiplier 108 provides for multiplying the integrated signal by a factor between "0" and "K". As shown in FIG. 5, the multiplying factor decreases from "K" to "0" within a limited range of vehicle speeds between "S₃" and "S₄" (e.g., between 50 kilometers per hour and 60 kilometers per hour).

The driver 80 converts the output of the vehicle speed function multiplier 108 into a command signal for controlling operation of the pressure control valve 30. At low vehicle speeds, i.e., less than "S₃", restriction to differentiation is increased as a function of the average duration of wheel slip over the predetermined time interval. However, at vehicle speeds between "S₃" and "S₄", the restriction is limited by the multiplying factor of the vehicle speed function, which decreases from "K" to "0" within the just-mentioned speed interval. No differential restriction is permitted at vehicle speeds above "S₄".

Figure 6:
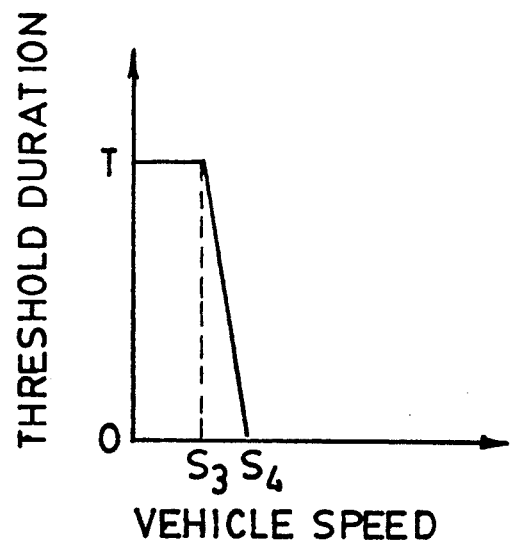
FIG. 6 is a graph showing a relationship between vehicle speed and a threshold duration for adjusting a delay in responding to wheel slip with a reduction in engine output power.

One input to the comparator 110 is provided by the integrated signal output from the integrator 106. The other input of the comparator 110 is provided by a threshold setting device 112, which outputs a minimum threshold duration. FIG. 6 shows the threshold duration from the threshold setting device 112 varying between durations of between "T" and "0" within the same range of vehicle speeds "S₃" to "S₄" throughout which the multiplying factor of FIG. 5 also decreases. The threshold duration "T" corresponds to a minimum duration required to increase differential restriction to a maximum at vehicle speeds less than "S₃". However, at vehicle speeds equal to or greater than "S₄", the threshold duration is reduced to zero.

The output from the comparator 110 is also a binary signal having two states that distinguish between outputs of the integrator 106 that are above and below the threshold duration provided by the threshold setting device 112. An integrator 114 receives the binary output signal from the comparator 110 and produces a signal indicative of an average positive output from the comparator over a predetermined interval of time. At vehicle speeds above "S₄", the output from integrator 114 is the same as the output from integrator 106. However, the output from integrator 114 is not further affected as a function of vehicle speed and provides a signal that is converted by driver 82 into a command signal for controlling operation of the throttle actuating motor.

At low vehicle speeds (less than "S₃"), the high threshold duration "T" prevents any automatic reduction in engine output power in response to the detection of wheel slip until differential restriction is at a maximum. At high vehicle speeds (greater than "S₄"), differential restriction is not permitted and engine power is immediately reduced as a function of the duration of wheel slip. Between the low and high vehicle speeds ("S₃" and "S₄"), the reduction in engine output power gradually replaces differential restriction as a primary response to wheel slip.

Although the invention has been illustrated with differential restriction between the rear wheels 14 and 16 of the rear wheel drive vehicle 10, differential restriction could be similarly controlled between the front wheels of front wheel drive vehicles and between the front and rear wheels of all wheel drive vehicles. Also, wheel slip could be detected by monitoring the drive train for mechanical vibration instead of rotational speed.

I claim:

1. A method of controlling wheel slip by drive wheels of a motor vehicle having a drive train connecting an engine to the drive wheels including the steps of:
   monitoring the drive train for a pronounced vibration induced by a slipping drive wheel;
   measuring a duration of the pronounced vibration;
   restricting differentiation between the drive wheels as a function of a measured duration of the vibration; and
   reducing engine output power to the drive train as a function of a difference between the measured duration of the vibration and a threshold duration.

2. The method of claim 1 including the further step of measuring vehicle speed.

3. The method of claim 2 in which differential restriction also varies with a measured vehicle speed within a range of vehicle speeds.

4. The method of claim 3 in which the threshold duration also varies with the measured vehicle speed within said range of vehicle speeds.

5. The method of claim 4 in which differential restriction decreases with increases in vehicle speed throughout said range of vehicle speeds.

6. The method of claim 5 in which the threshold duration also decreases with increases in vehicle speed throughout said range of vehicle speeds.

7. The method of claim 6 in which a vehicle speed within said range of vehicle speeds at which differential restriction is at a minimum corresponds to a vehicle speed at which the threshold duration is also at a minimum.

8. The method of claim 6 in which a maximum threshold duration corresponds to a duration of wheel slip required to increase differential restriction to a maximum.

9. The method of claim 1 in which said step of monitoring the drive train includes steps of producing first and second signals indicative of respective rotational speeds of the drive wheels, combining the first and second signals into a third signal indicative of an average rotational speed of the drive wheels, and transmitting a portion of the third signal as a fourth signal that is limited to a predetermined frequency range of drive wheel speed fluctuations.

10. The method of claim 9 in which said step of monitoring the drive train also includes steps of producing a fifth signal that is proportional to an amplitude of the drive wheel speed fluctuations of the fourth signal, comparing magnitudes of the fifth signal to a threshold magnitude, and producing a sixth signal having a first state indicative of magnitudes that are above the threshold magnitude and a second state indicative of magnitudes that are below the threshold magnitude.

11. The method of claim 10 in which said step of monitoring the drive train also includes a step of decreasing the threshold magnitude with increases in vehicle speed.

12. The method of claim 10 in which said step of measuring a duration of the pronounced vibration includes producing a seventh signal proportional to a duration of the first state in the sixth signal.

13. The method of claim 12 in which said step of restricting differentiation includes converting the seventh signal into a first command signal corresponding to a predetermined restriction to differentiation between the two drive shafts.

14. The method of claim 13 in which said step of reducing engine output power includes converting a portion of the seventh signal into a second command signal corresponding to a predetermined reduction in engine output power.

15. A traction control system for controlling wheel slip by drive wheels of a motor vehicle having a drive train for connecting an engine to the drive wheels comprising:

at least one sensor for detecting a pronounced vibration in said drive train induced by a slipping drive wheel;

a controller for measuring a duration of the pronounced vibration, for producing a first command signal as a function of a measured duration of the vibration, and for producing a second command signal as a function of a difference between the measured duration of the vibration and a threshold duration;

a first actuator responsive to the first command signal for restricting differentiation between the drive wheels; and a second actuator responsive to the second command signal for reducing engine output power to the drive wheels.

16. The traction control system of claim 15 including a sensor for measuring vehicle speed.

17. The traction control system of claim 16 in which the first command signal decreases with increases in speed throughout a range of vehicle speeds.

18. The traction control system of claim 17 in which the threshold duration also decreases with increases in vehicle speed throughout said range of vehicle speeds.

19. The traction control system of claim 18 in which a vehicle speed at which the first command signal is at a minimum corresponds to a vehicle speed at which the threshold duration is at a minimum.

20. The traction control system of claim 18 in which a maximum threshold duration corresponds to a duration of the vibration induced by wheel slip required to increase said first command signal to a maximum.

21. The traction control system of claim 15 in which said at least one sensor includes a first speed sensor and a second speed sensor for monitoring respective rotational speeds of two drive shafts interconnected by a differential and for producing respective signals indicative of the rotational speeds of the two drive shafts.

22. The traction control system of claim 21 in which said controller also provides for combining the respective signals from the first and second speed sensors into an averaged signal and for transmitting a portion of the averaged signal as a filtered signal that is limited to a predetermined frequency range of drive wheel speed fluctuations.

23. The traction control system of claim 22 including a sensor for measuring vehicle speed.

24. The traction control system of claim 23 in which said controller also provides for comparing a magnitude of the filtered signal against a threshold magnitude that varies with vehicle speed and for producing a signal that distinguishes between magnitudes of the filtered signal that are above and below the threshold magnitude.

25. The traction control system of claim 24 in which the threshold magnitude decreases with vehicle speed throughout a range of vehicle speeds.

26. A system for detecting wheel slip by drive wheels of a motor vehicle having a drive train for connecting an engine to the drive wheels comprising:

a sensor for detecting a pronounced vibration in said drive train induced by a slipping drive wheel and for transmitting a sensor signal that is limited to a predetermined frequency range of drive wheel speed fluctuations;

a comparator for comparing magnitudes of the sensor signal to a threshold magnitude for determining the existence of wheel slip; and a threshold setting device for varying the threshold magnitude with vehicle speed.

27. The system of claim 26 in which the threshold magnitude of said comparator decreases with vehicle speed.

28. The system of claim 27 in which said comparator produces a comparator signal that distinguishes between magnitudes of the sensor signal that are above and below the threshold magnitude.

29. The system of claim 28 further comprising a timer for producing a timing signal proportional to a duration of the comparator signal above the threshold magnitude.

30. The system of claim 27 including a separate sensor for detecting vehicle speed.

31. A system for detecting wheel slip by a drive wheel of a motor vehicle having a motor and at least two drive shafts that are operatively connected to the motor for driving different drive wheels comprising:

a first speed sensor for monitoring rotational speed of a first of the two drive shafts and for producing a signal indicative of the rotational speed of the first drive shaft;

a second speed sensor for monitoring rotational speed of a second of the two drive shafts and for producing a signal indicative of the rotational speed of the second drive shaft;

a speed averager for combining said first and second signals into a third signal indicative of an average rotational speed of the two drive shafts;

a filter for transmitting a portion of the third signal as a fourth signal that is limited to a predetermined frequency range of drive shaft speed fluctuations;

a level detector for producing a fifth signal that is proportional to an amplitude of the drive shaft speed fluctuations of the fourth signal; and a comparator for comparing magnitudes of the fifth signal to a threshold magnitude and for producing a sixth signal that distinguishes between magnitudes of the fifth signal that are above and below the threshold magnitude.

32. The system of claim 31 in which the threshold magnitude of said comparator decreases with vehicle speed.

33. The system of claim 32 in which the sixth signal has a first state indicative of magnitudes that are above the threshold magnitude and a second state indicative of magnitudes that are below the threshold magnitude.

34. The system of claim 33 further comprising a timer for producing a seventh signal proportional to a duration of the first state in the sixth signal.

35. The system of claim 34 in which said timer is an integrator that approximates a moving average of the duration of the first state over a predetermined time interval.

* * * * *